E. E. LEACH.
Wheel-Cultivator.

No. 159,689

2 Sheets--Sheet 2

Patented Feb. 9, 1875.

UNITED STATES PATENT OFFICE.

EDWIN E. LEACH, OF CEDAR RAPIDS, IOWA.

IMPROVEMENT IN WHEEL-CULTIVATORS.

Specification forming part of Letters Patent No. 159,689, dated February 9, 1875; application filed October 17, 1874.

*To all whom it may concern:*

Be it known that I, EDWIN E. LEACH, of Cedar Rapids, in the county of Linn and State of Iowa, have invented a certain Improvement in Wheel-Cultivators, of which the following is a specification:

The nature of my invention, which relates to what are termed straddle-row wheel-cultivators, consists in making the elevated part of the axle-tree, which straddles the row of growing crop when the machine is at work, vertically adjustable with reference to the points where the cultivator plow-beams are hinged, so that the machine may be readily adapted to cultivate crops that have already grown to considerable height, as well as young crops.

Figure 1:
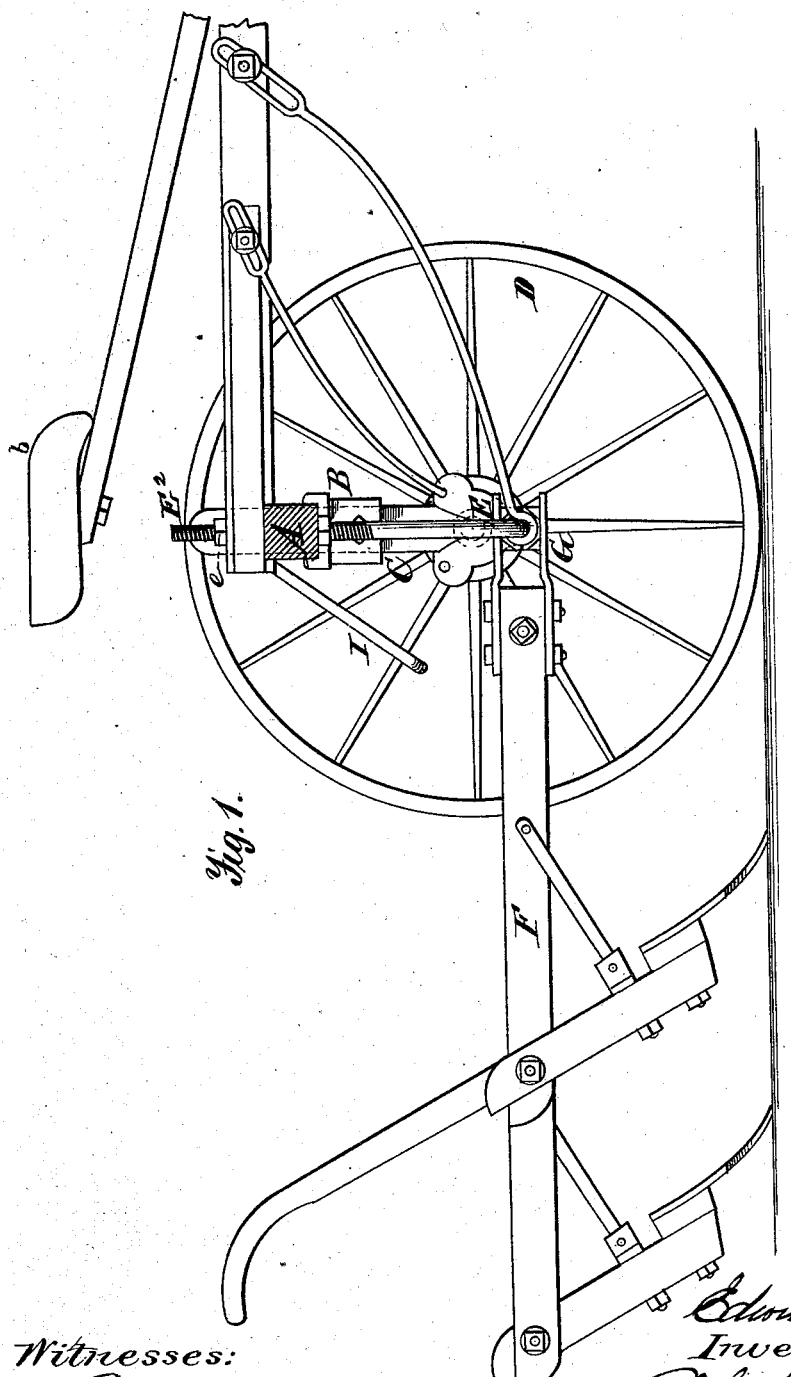
Figure 2:
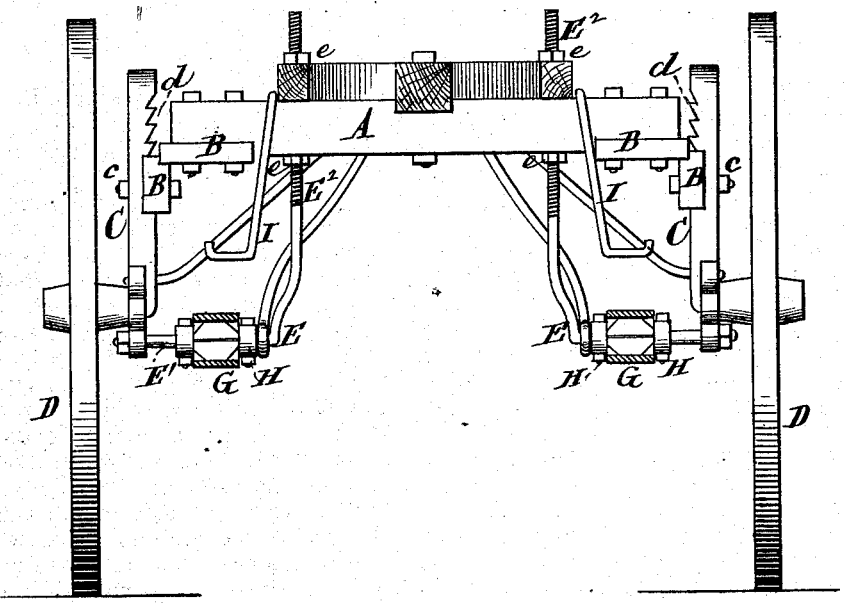
Figure 3:

In the annexed drawings, Figure 1 is a sectional side elevation of my improved wheel-cultivator. Fig. 2 is a sectional rear elevation of the same. Fig. 3 is a detail view, illustrating one of the confining-clips.

The same letters of reference are used in all the figures in the designation of identical parts.

In the example illustrated the elevated part A of the axle-tree is connected by angle-plates B to standards C, rising from the journals, on which the wheels D turn, in close proximity to the hubs of such wheels. The standards have upwardly-projecting serrations $d$ on the face, which is fitted to slide in a way formed in the vertical wing of the angle-plate B, the horizontal wing of which is firmly secured to the axle-tree A. The bolts $c$, which clamp the angle-plates to the standards, pass through a slot in the latter, elongated to an extent necessary to permit the desired range of vertical adjustability of the axle-tree A. The serrations $d$ will prevent any sagging of the latter when once adjusted. The standards are elongated downward beyond the journals of the wheels, and to these elongations are connected the horizontal arms or ends $E^1$ of the angular supporting-bars E, the vertical ends $E^2$ of which pass through holes in the elevated part A of the axle-tree, and are secured thereto by nuts $e\ e$, one below and the other above the axle-tree, the ends $E^2$ being suitably elongated and screw-threaded to permit of proper attachment to the axle-tree in both its lowest and highest positions, as well as at all intermediate points. Aside from the function assigned to them in connection with the plow-beams, these supporting or draft bars serve another important purpose, namely, that of forming strong braces between the standards C and axle-tree A at points where strength is greatly needed. The plow-beams F are connected to the horizontal ends $E^1$ of the supporting-bars by swivel-joints G, of any approved or preferred construction, and the ends $E^1$ are made of the proper length to permit the usual range of lateral adjustment of the plow-beams. They are localized by a pair of clips, H, one being clamped to the supporting-bar on either side of each joint G. The clips are composed each of a stirrup, $h$, and a clamping bolt and nut, $h'$, as clearly shown in Fig. 3. They can be applied laterally to the supporting-bar, so that in case one is broken a new one can be substituted without detaching the supporting-bar. The frame-work of the carriage is suitably braced, and hooks I are provided, on which to hook the plow-beams during transport.

Of course I do not claim a vertically-adjustable axle-tree in a carriage for drawing cultivator or other plows for tilling the soil, as that feature is very old in wheel-plows.

What I claim as my invention, and desire to secure by Letters Patent, is—

The combination of the elevated vertically-adjustable part A of the axle-tree, standards C, and combined supporting or draft bars and braces E $E^1$ $E^2$, substantially as and for the purpose specified.

In testimony whereof I have signed my name to the foregoing specification in the presence of two subscribing witnesses.

EDWIN E. LEACH.

Witnesses:
E. G. PRICE,
A. W. DEAN, Jr.